No. 813,357. PATENTED FEB. 20, 1906.
T. A. DAVIS.
GAS LIGHT SWITCH.
APPLICATION FILED MAY 17, 1905.

Witnesses:
Claude B. Faughlin
Wm. Truitt

Inventor:
Thomas Albert Davis

UNITED STATES PATENT OFFICE.

THOMAS ALBERT DAVIS, OF FINDLAY, ILLINOIS.

GAS-LIGHT SWITCH.

No. 813,357.   Specification of Letters Patent.   Patented Feb. 20, 1906.

Application filed May 17, 1905. Serial No. 260,897.

*To all whom it may concern:*

Be it known that I, THOMAS ALBERT DAVIS, a citizen of the United States, residing at Findlay, in the county of Shelby and State of Illinois, have invented a new and useful Gas-Light Switch, of which the following is a specification.

This invention has relation to means for controlling or regulating the supply of gas to pipes in gas-lighting apparatuses.

It is the object of the invention to provide means whereby in three gas-supply pipes a full supply may be continuously admitted to one of said pipes and instantly, as it were, shifted from one to the other of the other two, shutting off the supply from one of the last two pipes mentioned the moment it is turned on the other, enough gas to barely keep the burners lighted being in all cases supplied to the pipes, which are fully supplied and "shut off" intermittingly.

While it is the purpose of the invention to apply it wherever it may be usefully employed, it is especially adapted for use in theaters, opera-houses, and other buildings and places where a speedy change in the lights is required.

The nature of my invention is clearly indicated in the statement of its objects, so that it need not be iterated or stated here further than to say that it will be fully described hereinafter and be particularly pointed out in the subjoined claims.

The drawings hereto annexed form a part of this specification and are to be referred to as such, in which—

Figure 1:
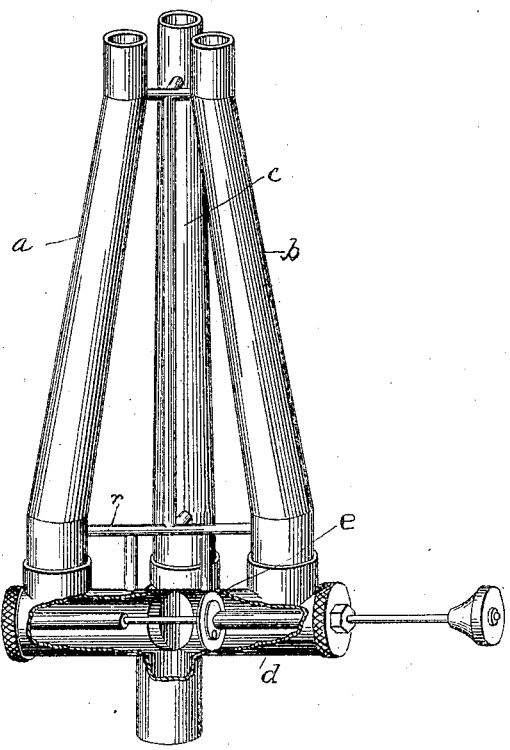
Figure 2:
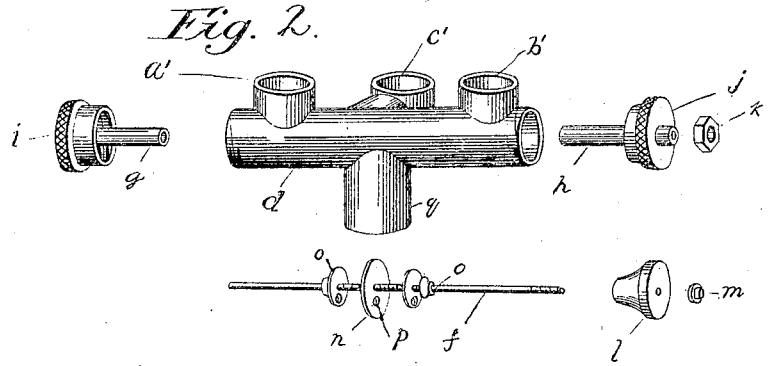

Figure 1 is a side elevation of the invention, a portion of the switch-cylinder being represented as broken away in order to more clearly show the construction and operation of the apparatus. Fig. 2 represents the switch-cylinder and parts of unions or means for connecting pipes therewith, the ends being taken out, but shown separately opposite the ends of the switch-cylinder, and the plunger-rod and its equipments being shown separately below the cylinder.

Similar letters of reference indicate separate parts or features, as the case may be, wherever they occur.

Referring to Fig. 1, and supposing the invention to be employed to control the light in a theater or opera-house, $a$ and $b$ designate the gas-delivery pipes leading to lamps or burners which are desired to burn alternately or intermittingly, such as those in the auditorium and at the footlights, while $c$ designates the supply-pipe leading to lamps or burners desired to burn continuously, such as those in the dressing-rooms.

$d$ designates the switch-cylinder, which is arranged horizontally and is provided with parts of unions $a'$, $b'$, and $c'$, by which the substantially vertical pipes $a$, $b$, and $c$ are connected to the switch-cylinder. The said switch-cylinder is provided at its ends with ports through which gas from the switch-cylinder is supplied to the pipes $a\ b$, and the central port $e$ opens into the pipe $c$, and its gas-supply is received therethrough. The central port $e$ may also serve as a gas-receiving port from the pipe $q$.

$f$ designates the plunger-rod, which is supported at its ends in the tubes $g\ h$, projecting inward from the packing-nuts $i\ j$, which are adapted to be screwed on the ends of the switch-cylinder to close the same. The tube $h$ extends through the nut $j$ and projects slightly beyond it, and the end of the plunger-rod extends through the tube projection, and a packing-nut $k$ is screwed on the projection, while a knob $l$ will be turned on the projecting end of the plunger-rod and a nut $m$ is screwed upon the extreme outer end of said rod, which projects beyond the knob $l$ just far enough to permit of this being done.

A valve $n$, of leather or other suitable material, is placed upon the plunger-rod at the proper point, which is near its longitudinal center, and is given a gas-tight fit on the inside of the cylinder. The valve is backed upon both sides by metallic disks $o\ o$, smaller in diameter than the valve, so as to allow of enough leather projecting beyond the peripheries of the disks to enable it to rub gas-tight against the interior surface of the cylinder.

When the plunger-rod is operated to its fullest extent toward the gas-pipe $a$, it will open the port in the cylinder $d$ for a full supply of gas to enter the pipe $b$, and when the said plunger and the valve carried by it are moved to the extreme limit toward the pipe $b$ the port for supplying pipe $a$ will be fully opened, the port $e$ for the supply of pipe $c$ being always open, as will be understood without further description. This change in the supply of gas to either pipe $a$ or $b$ is quickly accomplished, and no liability exists of an improper operation of the plunger-rod $f$, since the tubes $g\ h$ act as stops to prevent the rod from being moved too far.

Small holes $p$ are made through the valve

*n* and its back-up disks *o o* to allow enough gas to pass therethrough to just keep the burners or lamps lighted, so that when the gas is turned on the lights will "flare up" to their fullest extent without the reapplication of a flame.

The pipe *q* is the main or a connection with the main which supplies gas to the plunger-cylinder.

If it should happen that a full supply of gas was wanted in all of the pipes *a*, *b*, and *c*, the plunger-rod can be moved so as to bring its valve to the center of the port *e*, through which the supply enters pipe *c*, with the effect of fully opening the ports to pipes *a* and *b* and not closing port *e* to an appreciable extent so far as the supply of gas to the burners and lamps is concerned.

*r* designates brace-rods for steadying the position of the pipes. These may be arranged as shown or in any other desired manner.

The quickness with which the supply of gas to the pipes can be changed or regulated is an important feature of the invention.

It is understood, of course, that mechanical changes can be made in my improvement without affecting the nature or spirit of the invention.

I claim—

1. The plunger-cylinder, provided with a port at each end and one at the center, a gas-pipe communicating with each port, combined with a rod equipped with a valve having a small hole through it from side to side, which valve is adapted to be moved from side to side of the central port, and supports and stops for the rod in the cylinder.

2. A gas-receiving device provided with two ports at opposite points and a central port and pipes communicating with said ports, combined with a valve consisting of a flexible disk on the said rod having a gas-tight fit on the inside of the cylinder and backed upon both sides by metallic disks smaller in diameter than said valve movable from side to side of the central port, and means for moving said valve.

3. A gas-receiving device consisting of a horizontal cylinder with two ports at opposite points and a central port and pipes communicating with said ports, combined with short tubes extending inward a short distance from each end of the cylinder, a plunger-rod adapted to move longitudinally in said cylinder and pipes, a valve on said rod to control the said ports, and to be stopped by abutting against the inner ends of said tubes.

In testimony whereof I have signed my name to this specification in the presence of two subscribing witnesses.

THOMAS ALBERT DAVIS.

Witnesses:
W. B. WALLACE,
S. B. PERRY.